(12) United States Patent
Yamamoto

(10) Patent No.: US 10,953,742 B2
(45) Date of Patent: Mar. 23, 2021

(54) FUEL TANK

(71) Applicant: Kawasaki Jukogyo Kabushiki Kaisha, Kobe (JP)

(72) Inventor: Teruaki Yamamoto, Himeji (JP)

(73) Assignee: KAWASAKI JUKOGYO KABUSHIKI KAISHA

( * ) Notice: Subject to any disclaimer, the term of this patent is extended or adjusted under 35 U.S.C. 154(b) by 100 days.

(21) Appl. No.: 16/116,431

(22) Filed: Aug. 29, 2018

(65) Prior Publication Data
US 2019/0193556 A1 Jun. 27, 2019

(30) Foreign Application Priority Data

Dec. 21, 2017 (JP) ............................. JP2017-244617

(51) Int. Cl.
*B60K 15/035* (2006.01)
*B60K 15/04* (2006.01)

(52) U.S. Cl.
CPC ............ *B60K 15/035* (2013.01); *B60K 15/04* (2013.01); *B60K 2015/03552* (2013.01); *B60K 2015/03576* (2013.01); *B60K 2015/0438* (2013.01); *B60K 2015/0451* (2013.01); *B60K 2015/0496* (2013.01)

(58) Field of Classification Search
CPC .............. B60K 15/035; B60K 15/04; B60K 2015/03552; B60K 2015/03576; B60K 2015/0438; B60K 2015/0451; B60K 2015/0496
USPC .................................................. 220/562, 86.2
See application file for complete search history.

(56) References Cited

U.S. PATENT DOCUMENTS

| | | | | |
|---|---|---|---|---|
| 6,000,426 A | * | 12/1999 | Tuckey | B60K 15/035 123/516 |
| 6,807,952 B1 | * | 10/2004 | Amellal | B01D 35/0273 123/516 |
| 2002/0148660 A1 | * | 10/2002 | Viebahn | B60K 15/04 180/69.4 |
| 2008/0156800 A1 | * | 7/2008 | Mougenot | B60K 15/0403 220/86.3 |
| 2012/0074139 A1 | * | 3/2012 | Hisadomi | B60K 15/04 220/200 |
| 2012/0118159 A1 | * | 5/2012 | Kitamura | F02M 25/089 96/152 |
| 2013/0008899 A1 | * | 1/2013 | Hisadomi | B60K 15/03 220/86.2 |
| 2015/0096648 A1 | * | 4/2015 | Ballard | B67D 7/367 141/212 |
| 2017/0210222 A1 | * | 7/2017 | Covert | B60K 15/0406 |
| 2017/0334286 A1 | * | 11/2017 | Tanaka | B60K 15/03519 |
| 2018/0229600 A1 | * | 8/2018 | Higgin | B60K 15/03504 |

FOREIGN PATENT DOCUMENTS

JP 2015-044435 3/2015

* cited by examiner

*Primary Examiner* — J. Gregory Pickett
*Assistant Examiner* — Niki M Eloshway

(57) ABSTRACT

A fuel tank includes a tank main body configured to reserve a quantity of fuel therein and an oil feed tube fitted to the tank main body to form a fuel feed port. The fuel feed tube has a tip end configured to protrude inwardly of the tank main body, and the tip end is positioned below the upper limit level of the fuel. At a location of the fuel feed tube above the upper limit level, a vent hole is formed to communicate between the interior of the tank main body and the interior of the oil feed tube.

6 Claims, 6 Drawing Sheets

PRIOR ART

FUEL TANK

CROSS REFERENCE TO THE RELATED APPLICATION

This application is based on and claims Convention priority to Japanese patent application No. 2017-244617, filed Dec. 21, 2017, the entire disclosure of which is herein incorporated by reference as a part of this application.

BACKGROUND OF THE INVENTION

Field of the Invention

The present invention relates to a closed type fuel tank including a tank main body to reserve a quantity of fuel therein and an oil feed tube fitted to the tank main body to define an oil feed port.

Description of Related Art

Fuel tanks generally mounted on vehicles such as, for example, automotive vehicles are of a structure in which fuel can be supplied into a tank main body through an oil feed tube and an oil feed port thereof is then closed. For example, it may occur that the fuel within the interior is vaporized as a result of change in temperature, accompanied by increase of the internal pressure inside the tank main body. If the oil feed port is opened under this condition during the fuel filling, it may occur that the fluid level within the tank main body is pressurized by the internal pressure to such an extent as to result in squirt of the liquid fuel from the oil feed port. In order to avoid the possibility of such squirt of the liquid fuel, various countermeasures have hitherto been suggested. (See, for example, the Japanese Laid-open Patent Publication No. 2015-044435.)

According to the above mentioned Laid-open Patent Publication No. 2015-044435, the design has been suggested in which the oil feed port is provided with a valve positioned at the outlet of the oil feed tube, so that the possibility of the liquid fuel being squirted from the oil feed port can be avoided by closing the valve, in the case of opening the oil feed port while the internal pressure inside the tank main body is being increased. It is, however, been found that the structure suggested in the above mentioned laid-open patent publication requires the use of such an extra valve in addition to the tank main body and the oil feed tube. For this reason, the number of component parts increases and the structure is also complicated.

SUMMARY OF THE INVENTION

In view of the foregoing, the present invention is intended to provide a fuel tank capable of avoiding the fuel squirt with a simplified structure.

In order to accomplish the foregoing object, the present invention provides a fuel tank which comprises: a tank main body configured to reserve fuel therein; and an oil feed tube fitted to the tank main body to define an oil feed port, in which the oil feed tube has a tip end configured to protrude inwardly of the tank main body, the tip end is positioned below an upper limit level of the fuel, and a vent hole is formed in a portion of the oil feed tube above the upper limit level, which vent hole communicates between the interior of the tank main body and the interior of the oil feed tube.

According to the above described construction, even when the oil feed port is opened under a condition in which the internal pressure inside the tank main body is increased, gas within the tank main body can be discharged from the vent hole through the oil feed tube by way of the oil feed port. Accordingly, the squirt of the liquid fuel within the tank main body through the oil feed port can be avoided. Moreover, since the vent hole is merely provided in the oil feed tube, the number of components does not increase and, also the structure is simplified. Also, the tip end of the oil feed tube is positioned at a location below the upper limit level of fuel, and the vent hole is formed above such upper limit level. Accordingly, it is possible to increase the quantity of fuel, which can be accumulated, with the upper limit level risen.

In the present invention, there may be provided an index indicative of the upper limit level, such index being configured to exist at a position that allows the index to be viewed through the oil feed port. According to this construction, during fueling, the upper limit level can be easily determined with naked eyes. In this case, the index referred to above may be in the form of the tip end of the oil feed tube that is comprised of a straight pipe. According to this construction, with a simplified structure, the upper limit level can be set up.

In the present invention, the oil feed tube referred to above may be configured to incline downward from the oil feed port towards the tip end with respect to the horizontal direction. According to this construction, flow of the fuel can be facilitated and, also, the tip end of the oil feed tube can be easily viewed from the oil feed port. Accordingly, a fueling work can be facilitated.

In the present invention, the vent hole referred to above may be provided in a plural number and may further comprise: an oiling tube cap configured to selectively open and close the oil feed port, a seal configured to seal an open end of the oil feed port; and a positioner configured to position the oiling tube cap to a constant open position and a constant close position, which positions are separated from each other in an axial direction of the oil feed port, by turning the oiling tube cap. In such case, a total surface area of the entire vent holes may be greater than the interspace surface area along an outer periphery of an interspace between the open end and the seal at the open position. According to this construction, since the total surface area of the vent holes, which may be on a suction side for the gas within the tank main body during the opening, is larger than the interspace surface area which may be on an exhaust side, the gas within the interior of the tank main body can be smoothly discharged.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DESCRIPTION OF PREFERRED EMBODIMENTS

Figure 1:
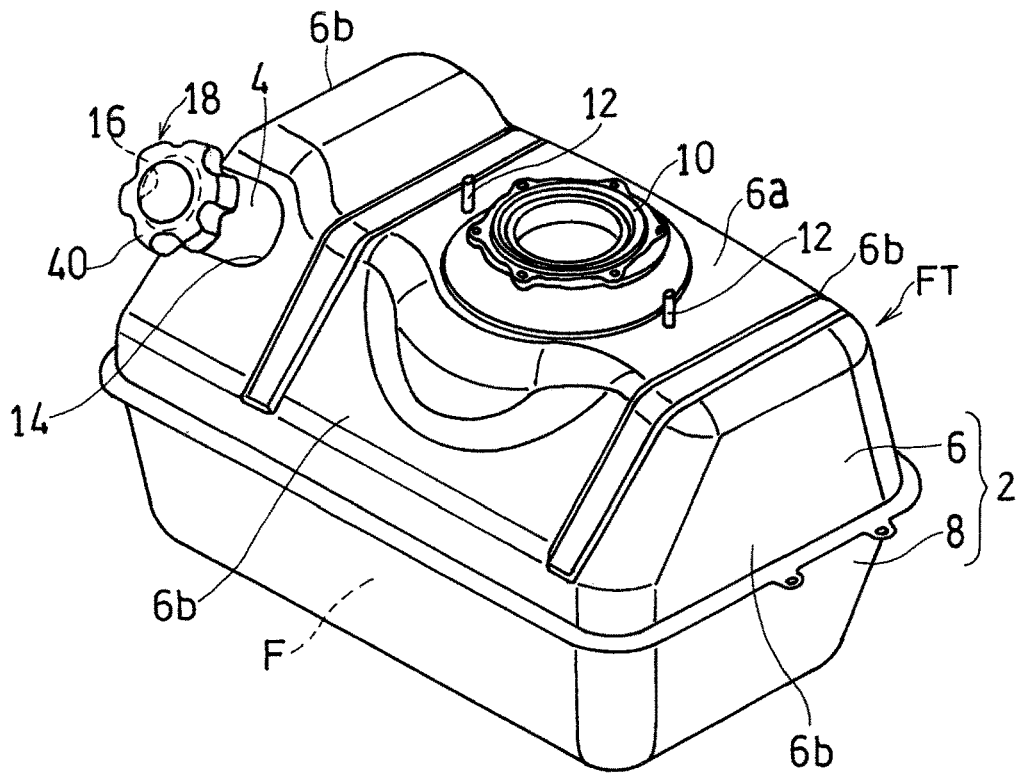
FIG. 1 is a perspective view showing a fuel tank according to a first preferred embodiment of the resent invention.

Hereinafter, the preset invention will be described in connection with preferred embodiments thereof with reference to the accompanying drawings. In particular, FIG. 1 illustrates a diagram showing a fuel tank FT according to a first preferred embodiment of the present invention. The fuel tank FT according to this embodiment is applied to, for example, a utility vehicle. The utility vehicle referred to above includes a vehicle such as all-terrain vehicle generally known as a four-wheeled buggy and means a vehicle capable of being driven on any geographical surface such as, for example, a muddy land, sand beach and/or snowy road. The utility vehicle is used in a variety of applications including, for example, leisure and/or or work. It is, however, to be noted that the fuel tank of the present invention can also be applied to any other vehicle than the utility vehicle and can also be applied to any engine other than the vehicle.

The fuel tank FT includes a tank main body 2 configured to reserve a quantity of fuel F therein and an oil feed tube 4 fitted to the tank main body 2. The illustrated tank main body 2 employed in the embodiment now under discussion is made of steel and is so shaped as to represent a substantially rectangular parallelepiped shape. Specifically, the tank main body 2 is of a split configuration made up of an upper half body 6 and a lower half body 8 positioned above the upper half body 6. The upper half body 6 and the lower half body 8 are connected together by means of, for example, welding.

The upper half body 6 includes a substantially flat upper surface 6a and four side surfaces 6b extending downwardly from the upper surface 6a. The upper surface 6a is formed with a fuel pump mounting seat 10 and a breather tube socket 12. A fuel pump (not shown) is fitted to the fuel pump mounting seat 10, and the fuel F within the tank main body 2 is fed towards an engine (not shown) by means of the fuel pump. One end of a breather tube is fluid connected with the breather tube socket 12, and a fuel vapor within the tank main body 2 is discharged through the breather tube. The other end of the breather tube is fluid connected with, for example, an intake passage in the engine.

Each of the four side surfaces 6b of the upper half body 6 is constituted by an inclined surface that flares downwardly outwardly from the upper surface 6a. One of the four side surfaces 6b is formed with a tube insertion hole 14.

The oil feed tube 4 employed in the practice of the preferred embodiment is in the form of a straight pipe of a cylindrical configuration made of steel. This oil feed tube 4 is, after having inserted in the tube insertion hole 14 defined in the upper half body 6 of the tank main body 2, fixed to the tank main body 2 by means of welding. An oil feed port 16 is formed in a base end (upper end) of the oil feed tube 4. The fuel F is supplied from this oil feed port 16 through the oil feed tube 4 to the tank main body 2. This oil feed port 16 is closed by an oiling tube cap 18. The oiling tube cap 18 is used to selectively open and close the oil feed port 16.

Figure 2:
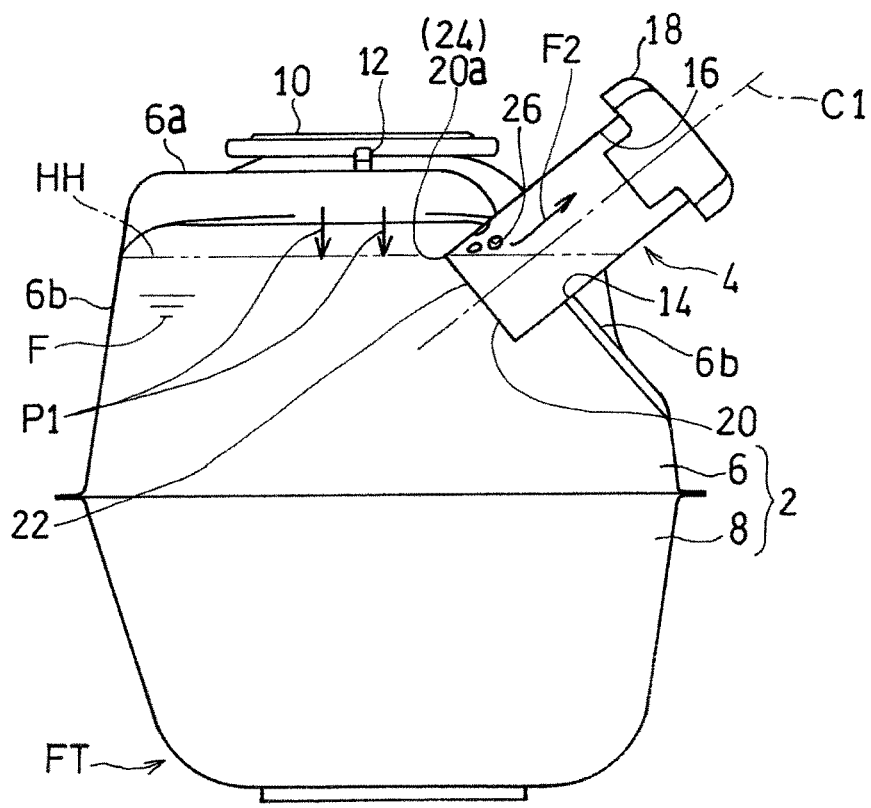
FIG. 2 is a longitudinal sectional view showing the fuel tank.

As shown in FIG. 2, the oil feed tube 4 has a tip end (lower end) 20 that protrudes inwardly into the tank main body 2. In the illustrated embodiment of the present invention, the oil feed tube 4 is so inclined as to descend downwardly from the oil feed port 16 towards the tip end 20 with respect to the horizontal direction.

The tip end 20 of the oil feed tube 4 is positioned downwardly of an upper limit level HH of the fuel. The term "upper limit level HH of the fuel" referred to hereinabove and hereinafter is intended to mean a position of the design upper limit to which the fuel F can be reserved within the interior of the tank main body 2. Also, the wording "the tip end 20 is positioned downwardly of the upper limit level HH of the fuel" is intended to mean that an outlet opening 22 of the tip end 20 in its entirety is positioned downwardly of the upper limit level HH of the fuel. In other words, in a condition in which the fuel F is supplied to the upper limit level HH, the outlet opening 22 including an upper edge 20a of the tip end 20 in its entirety is submerged in the fuel F to such an extent as to inhibit flow of air into the oil feed tube 4 through the outlet opening 22.

Figure 3:
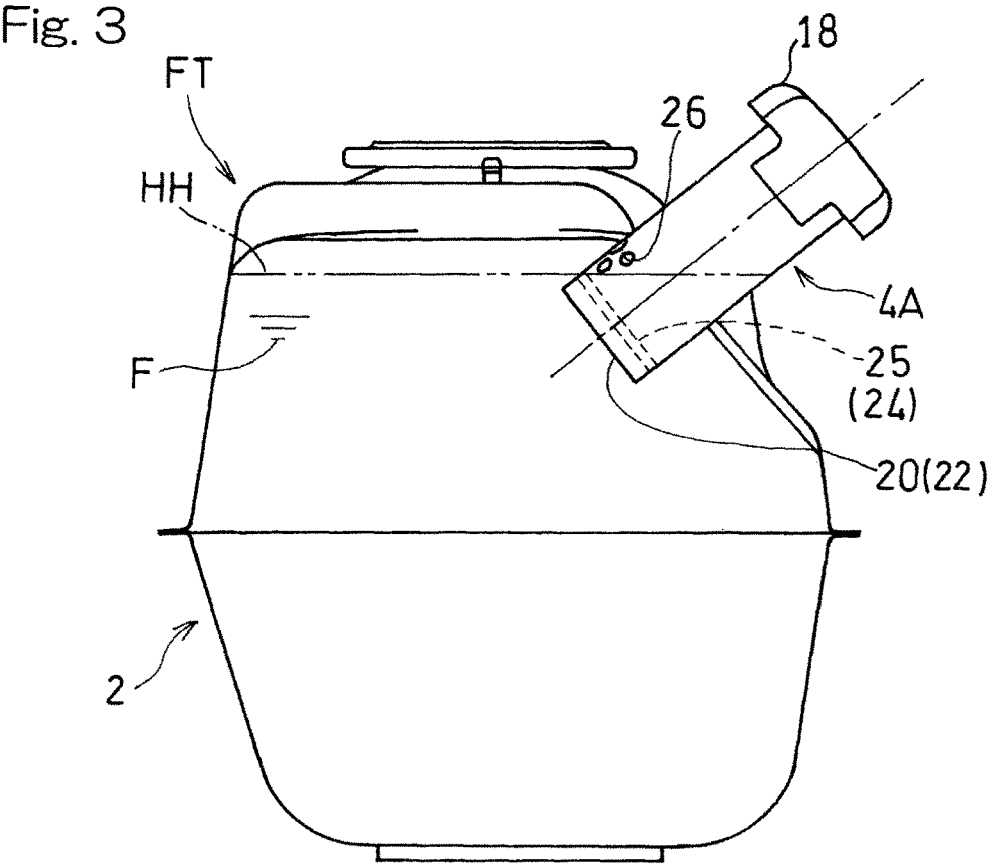
FIG. 3 is a longitudinal sectional view showing a modified form of the fuel tank of the present invention.

The oil feed tube 4 employed in the practice of the preferred embodiment is provided with an index 24 indicative of the upper limit level HH. This index 24 is defined at a position visible from the oil feed port 16 in the oil feed tube 4. In the practice of this preferred embodiment, the index 24 is represented by the upper edge 20a of the tip end 20 of the oil feed tube 4. It is, however, to be noted that the index 24 may not be necessarily limited to the upper edge 20a of the tip end 20 of the oil feed tube 4, but may be in the form of a marking 25 which is, for example, provided in an inner peripheral surface of the oil feed tube 4 as shown in FIG. 3 representing a modified form of the embodiment now under discussion. The marking 25 may be painted by the use of, for example, fluorescent paint.

Referring to FIG. 2, the outer peripheral surface of the oil feed tube 4 is formed with a vent hole 26 configured to communicate between the interior of the tank main body 2 and the interior of the oil feed tube 4. This vent hole 26 is formed at a position upwardly of the upper limit level HH of the oil feed tube 4. In the practice of the embodiment now under discussion, the vent hole 26 is formed in an upper surface of the oil feed tube 4. This vent hole 26 is provided in a plural number and, in the embodiment now under discussion, seven vent holes 26 each being 8 mm in diameter are employed. It is, however, to be noted that the size of each of the vent holes 26 and the number of the vent holes 26 employed are not necessarily limited to those discussed above.

Figure 4:
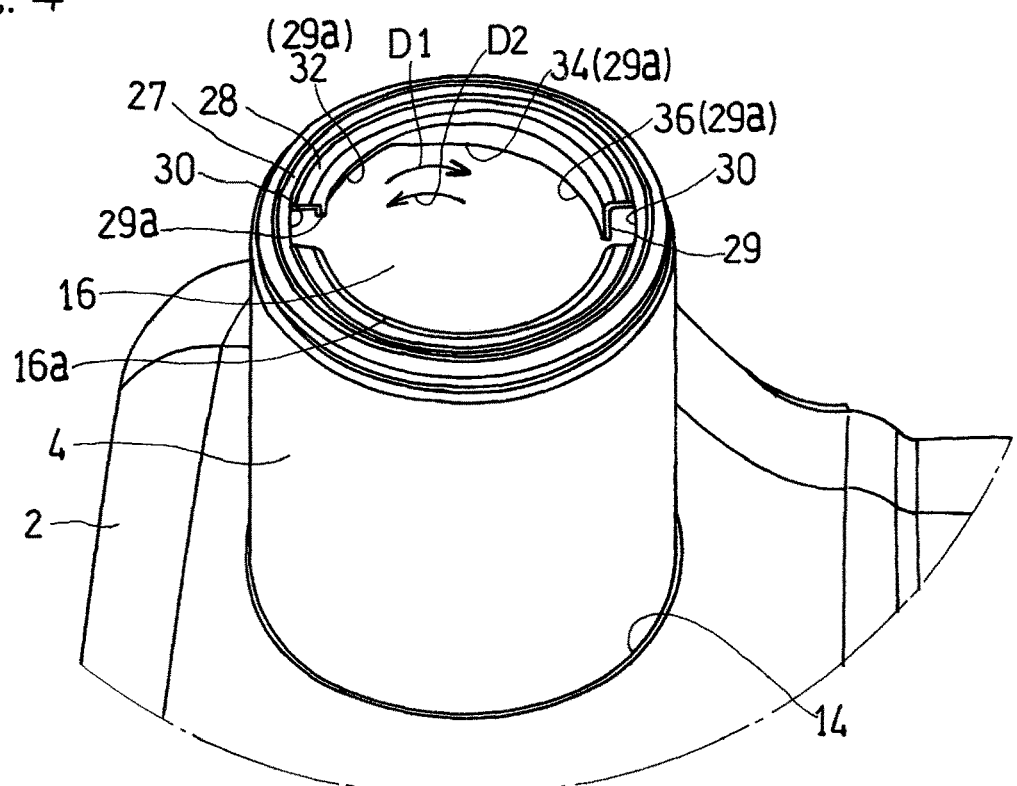
FIG. 4 is a perspective view showing an oil feed tube of the fuel tank.
Figure 5:
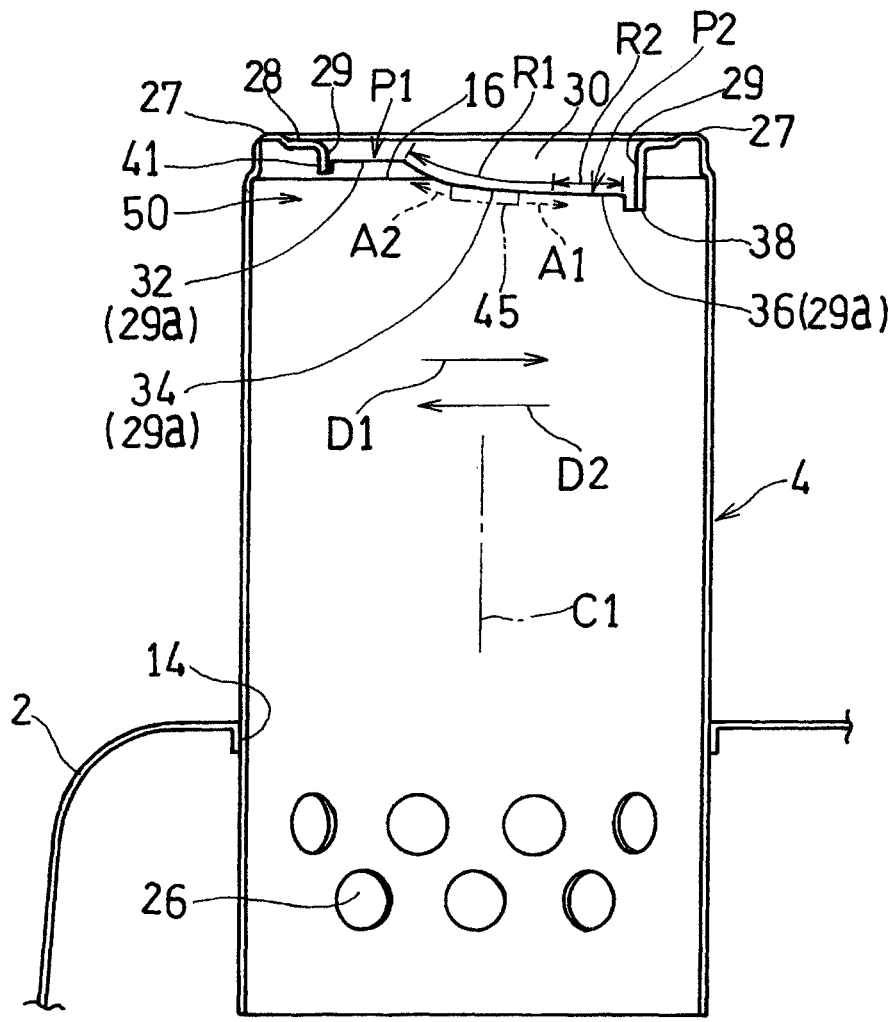
FIG. 5 is a longitudinal sectional view showing the oil feed tube.

FIG. 4 is a perspective view showing the oil feed tube 4 with the oiling tube cap 18 removed, and FIG. 5 is a longitudinal sectional view thereof. Referring now to FIGS. 4 and 5, an arrow headed line D1 indicates the direction of closing of the oiling tube cap 18 and an arrow headed line D2 indicates the direction of opening of the oiling tube cap 18. As best shown in FIG. 4, the upper end (base end) of the oil feed tube 4 is folded 90 degrees inwardly to define an apex area 27. Also, a stepped area 28 is formed at a position one step below the apex area 27 so as to extend radially inwardly of the apex area 27. This stepped area 28 lies parallel to the apex area 27. This stepped area 28 is further folded 90 degrees in a direction radially inwardly thereof to thereby define an edge area 29. This edge area 29 forms an edge 16a of the opening defining the oil feed port 16.

So as to extend from the stepped area 28 to the edge area 29 in the oil feed tube 4, a claw insertion opening 30 is formed. This claw insertion opening 30 is recessed radially outwardly from the open edge 16a of the oil feed port 16. The claw insertion opening 30 is employed two in number, having been circumferentially spaced 180 degrees from each other in the open edge 16a of the oil feed port 16.

As best shown in FIG. 5, the edge area 29 has a lower end 29a which is, at a position spaced from the claw insertion opening 30 (i.e., the left side claw insertion opening 30 as viewed in FIG. 5) in a direction conforming to the closing direction D1, formed with a first stepped portion 32 that extends straight in a direction conforming to the closing direction D1 after having been recessed upwardly.

The lower end 29a of the edge area 29 is also formed with a sloped portion 34 that extends gradually downwardly from the first stepped portion 32 in a direction conforming to the closing direction D1. The sloped portion 34 is a region that is indicated by R1 in FIG. 5. The lower end 29a of the edge area 29 is furthermore formed with a second stepped portion 36 that extends straight from the sloped portion 34 in a direction conforming to the closing direction D1. The second stepped portion 36 is a region that is indicated by R2 in FIG. 5. In other words, the first stepped portion 32 is formed on one side of the sloped portion 34 displaced in the opening direction D2, whereas the second stepped portion 36 is formed on one side of the second sloped portion 36 displaced in the closing direction D1. In other words, the first stepped portion 32 defines an open position P1 as will be described later and the second stepped portion 36 defines a close position P2 as will also be described later.

The second stepped portion 36 is connected with the claw insertion opening 30 (i.e., the right side claw insertion opening 30) through a first stopper portion 38 that extends below the second stepped portion 36. The first stopper portion 38 referred to above is a portion of the lower end 29a of the edge area 29 that occupies the lowermost position.

Figure 6:
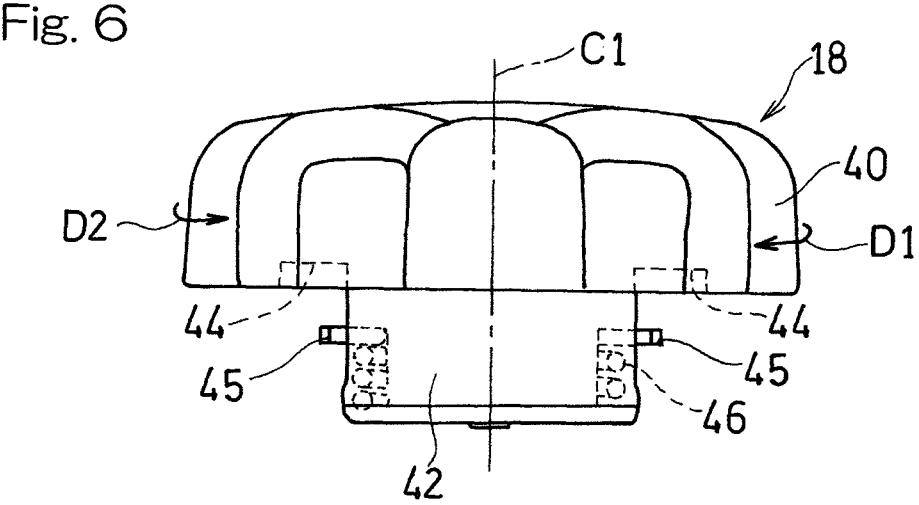
FIG. 6 is a side view showing an oiling tube cap of the fuel tank.
Figure 7:
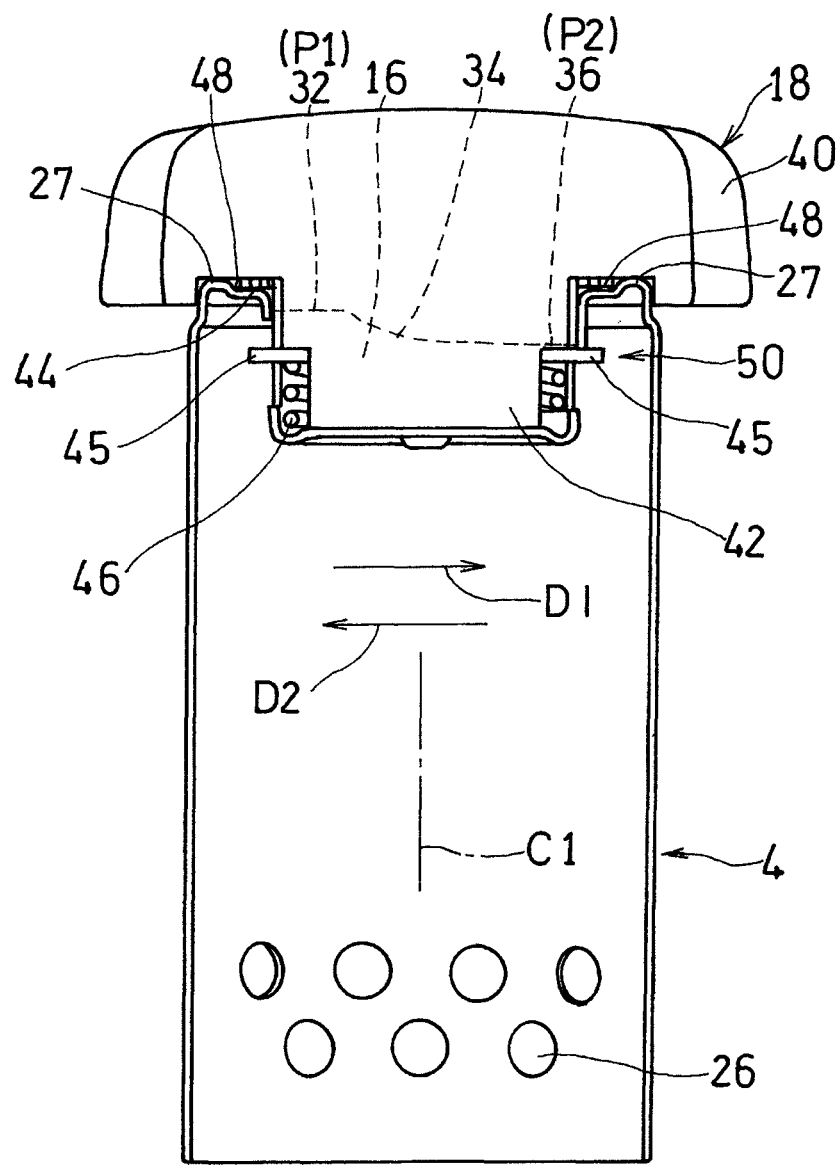
FIG. 7 is a longitudinal sectional view showing the fuel feed tube when the oiling tube cap is held at a close position.

As shown in FIG. 6, the oiling tube cap 18 includes a cap portion 40, which is exposed outwardly from the oil feed tube 4, and a lock portion 42 which is inserted into the oil feed tube 4. When the operator turns the oil tube cap 18 in the opening direction D2 while holding the cap portion 40 in hand, the oiling tube cap 18 can be removed. On the other hand, when the operator turns the oil tube cap 18 in the closing direction D1, the oiling tube cap 18 can be fitted in position. The cap portion has a lower surface formed with an annular sealing groove 44. This sealing groove 44 accommodates an annular seal or sealing washer 48 inserted therein as best shown in FIG. 7. The seal 48 is, for example, made of rubber. It is, however, to be noted that the material for the seal 48 may not necessarily be limited thereto.

The lock portion 42 is of a cylindrical configuration having its diameter slightly smaller than the diameter of the oil feed port 16. This lock portion 42 has its outer peripheral surface formed with an engagement claw 45 that protrudes radially outwardly from such outer peripheral surface. The two engagement claws 45 are formed in the outer peripheral surface of the lock portion 42 while being spaced 180 degrees in a circumferential direction. A spring member 46 is accommodated below the lock portion 42. This spring member 46 applies to the engagement claw 45 a spring force acting in a direction outwardly of the oil feed tube 4 along the axial direction C1 of the oil feed tube 4 (that is, in a direction towards an upper portion of FIG. 6). More specifically, the spring member 46 is so set as to apply an elastic restoring force to the engagement claw 45 at all times in a direction outwardly of the axial direction, and the engagement claw 45 is on the other hand, set to be movable in a direction inwardly of the oil feed tube 4 along the axial direction C1 (that is, in a direction towards a lower portion of FIG. 6) against the restoring force thereof.

As shown in FIG. 7, the seal 48 referred to above is interposed between the oil feed tube 4 and the oiling tube cap 18. The seal 48 so inserted serves to seal the opening end (apex area 27) of the oil feed port 16. Specifically, with the seal 48 inserted into the sealing groove 44 that is defined in the cap portion 40 of the oiling tube cap 18, the seal 48 is urged inwardly of the sealing groove 44 in contact with the apex area 27 at the opening end of the oil feed tube 4.

Hereinafter, the locking structure employed in the oiling tube cap 18 in accordance with the present invention will be discussed. The engagement claw 45 of the oiling tube cap 18 is passed through the claw insertion opening 30 (FIG. 4) in the oil feed tube 4, and the lock portion 42 of the oiling tube cap 18 is then inserted into the interior of the oil feed tube 4. When the cap portion 40 of the oiling tube cap 18, then held in hand, is manually turned in the direction conforming to the closing direction D1, the engagement claw 45 of the oiling tube cap 18 is, as indicated by the arrow A1 in FIG. 5, brought into contact with the second stepped portion 36 while having been guided by the sloped portion 34, followed by contact with the first stopper portion 38 at which the engagement claw 45 is thus positioned.

FIG. 7 illustrates the condition in which the engagement claw 45 is retained by the second stepped portion 36 to allow the oiling tube cap 18 to assume the close position P2, that is, the oiling tube cap 18 is mounted on the oil feed tube 4. With the engagement claw 45 retained by the second stepped portion 36, that is, with the oiling tube cap 18 held at the close position P2, the axial position of the oiling tube cap 18 relative to the oil feed tube 4 is defined. During this condition, the seal 48 mounted in the sealing groove 44 in the oiling tube cap 18 is pressed against the apex area 27 in the oil feed tube 4. At this time, by the action of the seal 48, the engagement claw 45 is urged upwardly, as viewed in FIG. 7, through the second stepped portion 36, and, therefore, the spacing between the apex area 27 and the sealing groove 44 comes to be fixed to allow the sealing pressure stabilized. Hence, leakage of the fuel F and the gas both, within the tank main body 2, to the outside can be avoided.

Removal of the oiling tube cap 18 will now be discussed. Starting from the condition shown in and described with particular reference to FIG. 7, when the cap portion 40 of the oiling tube cap 18, then held in hand, is manually turned in the direction conforming to the opening direction D2, the engagement claw 45 of the oiling tube cap 18 is guided by the sloped portion 34 to move in a direction towards the first stepped portion 34 as indicated by the arrow A2 in FIG. 5. Since the lower end 29a of the edge area 29 in the claw insertion opening 30 (i.e., the left side claw insertion opening 30) is formed in the second stopper portion 41 so as to protrude downwardly therefrom, the engagement claw 45 is retained by the first stepped portion 34 without being moved thereover.

Figure 8:
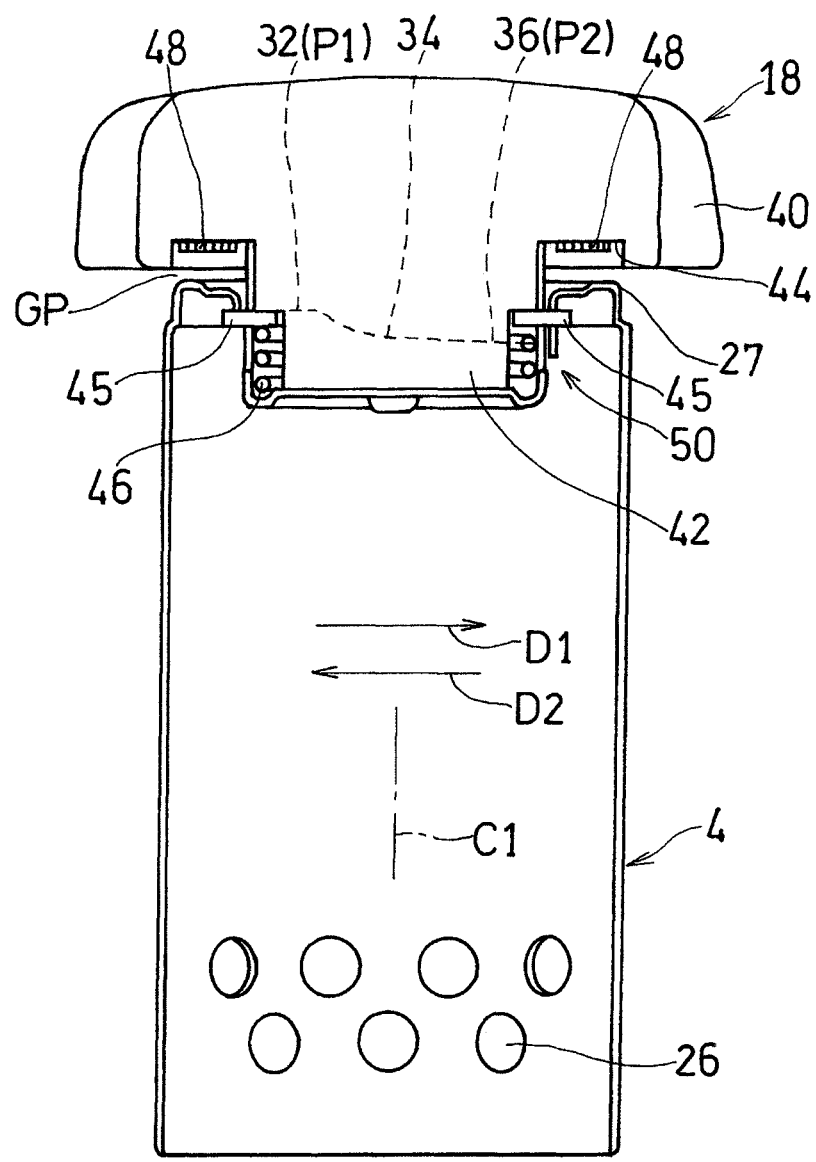
FIG. 8 is a longitudinal sectional view showing the fuel feed tube when the oiling tube cap is held at an open position.

FIG. 8 illustrates the condition in which the engagement claw 45 is retained at the first stepped portion 34, that is, the open position P1 with the oiling tube cap 18 then opened. In this condition, an annular gap or interspace GP is formed between the apex area 27 of the oil feed tube 4 and the seal 48. The internal pressure inside the tank main body 2 breaks out through this gap GP. In the practice of the embodiment now under discussion, the total surface area S1 of the plurality of the vent hole 26 is so chosen as to be larger than the interspace surface area S2 along the outer periphery of the annular gap GP between the seal 48 and the open end (apex area 27) at the open position P1.

Also, with the oiling tube cap 18 urged inwardly of the oil feed tube 4, the engagement claw 45 is moved to a position below the second stopper portion 41 in the claw insertion opening 30 (that is, the left side claw insertion opening 30 as viewed in FIG. 4). From this condition, the oiling tube cap 18 is turned in the opening direction D2 to allow the engagement claw 45 to move past the claw insertion opening 30 in the oil feed tube 4 and, in this way the oiling tube cap 18 can be removed out of the oil feed tube 4. After the oiling from the oil feed port 16, the oiling tube cap 18 is fitted to the oil feed tube 4 in a manner as described hereinabove.

As readily understood from the foregoing, the engagement claw 45 in the oiling tube cap 18, the first stepped portion 34, sloped portion 34 and second stepped portion 36 in the oil feed tube 4 cooperate with each other to define a positioning unit or positioner 50. This positioner 50 serves to selectively position the oiling tube cap 18 at the open position P1 and the closed position P2 that are spaced in the axial direction C1, when the oiling tube cap 18 is turned.

As described above, the oiling tube cap 18 is unable to rotate not larger than 180 degrees in either one of the closing and opening direction D1 and D2. In the practice of the embodiment now under discussion, the angle of turn of the oiling tube cap 18 is about 150 degrees. Since the angle of turn is small as described previously, the operability is good. Also, since the amount of rotation of the oiling tube cap 18 is small, variation of the pressing force of the apex area 27 that acts on the seal 48 is minimized. As a result thereof, the sealability can be stabilized, and also, deterioration of the seal 48 can also be suppressed.

Figure 9:
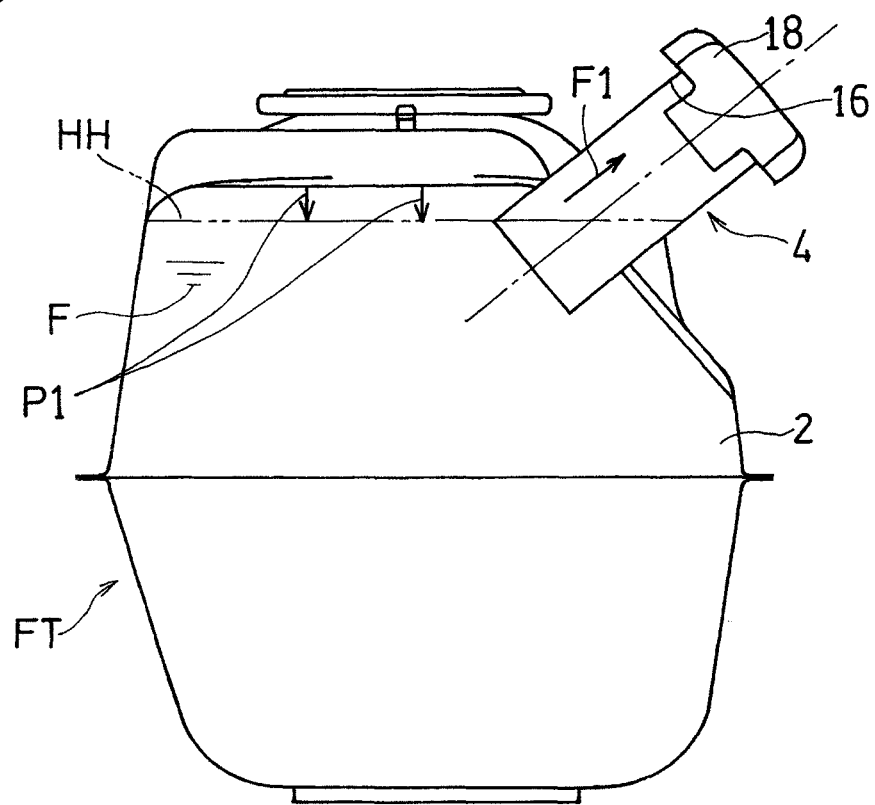
FIG. 9 is a longitudinal sectional view showing a fuel tank in a comparative example.

The fuel tank according to a comparative example is shown in FIG. 9. Except for the vent hole 26 employed in the embodiment shown in FIG. 2, the embodiment as described above and the comparative example shown in FIG. 9 are similar in all aspect of structure to each other. In FIG. 9, the fuel F is supplied to the upper limit level HH. In other words, the liquid fuel F is reserved to a level below the upper limit level HH and gas (that is, air) fills up within a space above the liquid fuel F so filled.

In this condition as shown in FIG. 9, if the fuel F within the interior evaporates with change in temperature and the interior pressure P1 inside the tank main body 2 increases incidentally, the surface level of the liquid fuel F is pressurized by the internal pressure P1. Therefore, if the oiling tube cap 18 is removed under this condition, it may occur that the liquid fuel F within the interior may squirt from the oil feed port 16 as shown by the arrows F1.

However, according to the above described construction designed in accordance with the present embodiment shown in FIG. 2, even when opening is made while the internal pressure P1 inside the tank main body 2 is increased, the gas inside the space in an upper portion of the tank main body 2 is discharged to the outside from the vent hole 26 and then through the oil feed port 16 by way of the oil feed tube 4 as shown by the arrow F2 in FIG. 2, without pressurizing the liquid level. Accordingly, any possible squirt of the liquid fuel F within the tank main body 2 from the oil feed port 16 can be prevented. Also, since the present embodiment works well only by employing the hole 26 in a portion of the oil feed tube 4, the number of component parts employed does not increase and the structure is simplified accordingly.

In the opened condition as shown in FIG. 8, the total surface area S1 of the plurality of the vent holes 26 is so chosen as to be larger than the interspace surface area S2 of the gap GP delimited between the seal 48 and the open end 27. Accordingly, since the total surface area S1 of the plurality of the vent holes 26, which serves as a suction side for the gas inside the tank main body 2 during the opening, is larger than the surface area S2 of the gap GP which serves as an exhaust side, the gas inside the interior of the tank main body 2 can be smoothly discharged.

Also, the tip end 20 of the oil feed tube 4 is positioned below the upper limit level HH, and the vent hole 26 is formed at a location upwardly of the upper limit level HH. Accordingly, with the upper limit level HH raised, it is possible to increase the quantity of the fuel reserved.

The index 24 indicative of the upper limit level HH is provided at the location visible through the oil feed port 16 in the oil feed tube 4 as shown in FIG. 2. Accordingly, during the oiling, the upper limit level HH can be visually discerned with ease. In the practice of the preferred embodiment of the present invention as discussed above, the upper end 20a of the tip end 20 of the oil feed tube 4 serves as the index 24. Accordingly, with a simplified structure, the upper limit level HH can be set out. In other words, by adjusting the length of the oil feed tube 4, the upper limit level HH can be easily set out. Thus, in the practice the embodiment of the present invention, the upper limit level HH can be controlled merely with the tank main body 2 and the oil feed tube 4.

In addition, the oil feed tube 4 is constituted by a straight tube and is inclined downwardly from the oil feed port 16 towards the tip end 20, the fuel F can easily flow in, and also, the index 24 at the upper end 20a of the tip end 20 can be easily viewable. Therefore, the oil refilling work is rendered to be easy to accomplish.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. By way of example, although in describing the above preferred embodiment of the present invention the oil feed tube 4 has been shown and described as inclined downwardly from the oil feed port 16 towards the tip end 20 relative to the horizontal direction, the oil feed tube 4 may be so disposed as extending parallel to the vertical direction.

Also, where the liquid level is invisible through the oil feed port 16, the use may be made of a liquid surface sensor so that the upper limit level HH can be detected.

Accordingly, such changes and modifications are, unless they depart from the scope of the present invention as delivered from the claims annexed hereto, to be construed as included therein.

2 . . . Tank main body
4 . . . Oil feed tube
16 . . . Oil feed port
18 . . . Oiling tube cap
20 . . . Tip end
24 . . . Index indicative of the upper limit level
26 . . . Vent hole
27 . . . Apex area (Open end)
48 . . . Seal 50 . . . Positioner
HH . . . Upper limit level of fuel
F . . . Fuel
FT . . . Fuel tank
P1 . . . Open position
P2 . . . Close position
S1 . . . Total surface area of the plurality of the vents
S2 . . . Interspace surface area

What is claimed is:

1. A fuel tank which comprises:
a tank main body configured to reserve fuel therein; and
an oil feed tube fitted to the tank main body to define an oil feed port wherein:
the oil feed tube includes a straight pipe terminating in a tip end protruding inwardly of the tank main body;
the tip end is positioned below an upper limit level of the fuel;
an index indicative of the upper limit level is formed on an upper side of the oil feed tube at the tip end of the oil feed tube, at a position that allows the index to be viewed through the oil feed port; and
a vent hole is formed in a portion of the oil feed tube above the upper limit level, the vent hole communicating between the interior of the tank main body and the interior of the oil feed tube, wherein
the oil feed tube is configured to incline downward from the oil feed port towards the tip end with respect to the horizontal direction,
the tip end is below the vent hole, and
the vent hole is formed in an upper surface of the oil feed tube.

2. The fuel tank as claimed in claim 1, wherein an upper end of the oil feed tube is located outside of the tank main body.

3. The fuel tank as claimed in claim 1, wherein
the tank main body includes an upper surface provided with an inclined surface which is inclined relative to the horizontal plane, and
the oil feed tube is connected to the inclined surface.

4. The fuel tank as claimed in claim 1, wherein
the tank main body includes an upper surface provided with a bulge portion which bulges upwardly relative to the other portion than the bulge portion, and
the oil feed tube contacts an outer surface of the upper surface at a location extending downwardly from the bulge portion.

5. The fuel tank as claimed in claim 4, wherein
the upper surface is provided with a fuel pump mounting seat to which a fuel pump is fitted, and
the fuel pump mounting seat is positioned in the vicinity of the bulge portion.

6. A fuel tank which comprises:
a tank main body configured to reserve fuel therein; and
a single-component oil feed tube fitted to the tank main body to define an oil feed port, wherein:
the oil feed tube terminates in a tip end protruding inwardly of the tank main body, and the oil feed tube has an upper end located outside of the tank main body;
the tip end is positioned below an upper limit level of the fuel;
a vent hole is formed in a portion of the oil feed tube above the upper limit level, the vent hole communicating between an interior of the tank main body and an interior of the oil feed tube;
there is provided an index indicative of the upper limit level, the index being configured to exist at a position that allows the index to be viewed through the oil feed port;
the index is in the form of the tip end of the oil feed tube that is comprised of a straight pipe;
the tip end is below the vent hole; and
the oil feed tube is configured to incline downward from the oil feed port towards the tip end with respect to the horizontal direction.

* * * * *